United States Patent
Nelson et al.

(10) Patent No.: US 6,338,827 B1
(45) Date of Patent: Jan. 15, 2002

(54) STACKED SHAPE PLASMA REACTOR DESIGN FOR TREATING AUTO EMISSIONS

(75) Inventors: David Emil Nelson, Waterford; Mark David Hemingway, Columbiaville; Gregory Stephen Sims, Detroit, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/511,590

(22) Filed: Feb. 23, 2000

Related U.S. Application Data

(60) Provisional application No. 60/141,427, filed on Jun. 29, 1999.

(51) Int. Cl.[7] .......................... B01J 19/08; B01J 19/12
(52) U.S. Cl. ................................ 422/186.04; 60/275
(58) Field of Search .......................... 422/186, 186.04; 60/275

(56) References Cited

U.S. PATENT DOCUMENTS 4,152,603 A * 5/1979 Imris ..................... 422/186.16
4,842,829 A * 6/1989 Hirai et al. ............. 422/186.08

* cited by examiner

Primary Examiner—Kathryn Gorgos
Assistant Examiner—Wesley A. Nicolas
(74) Attorney, Agent, or Firm—Vincent A. Cichosz

(57) ABSTRACT

A non-thermal plasma reactor element is provided comprising a multi-cell stack prepared from a plurality of formed building blocks of dielectric material, the walls of the building blocks defining a cell having an exhaust passage for flowing gas to be treated therethrough. A conductive print forming an electrode and connector is disposed on at least one wall of each of the cells and outer insulative plates, disposed on opposite ends of the multi-cell stack, are provided to protect the conductive print. The simplified design eliminates the need for spacers between individual cells, thus reducing the total number of components. Use of a three-dimensional conductive print further simplifies preparation by eliminating the need for a secondary conductive print along the edge of the multi-cell stack after assembly.

14 Claims, 4 Drawing Sheets

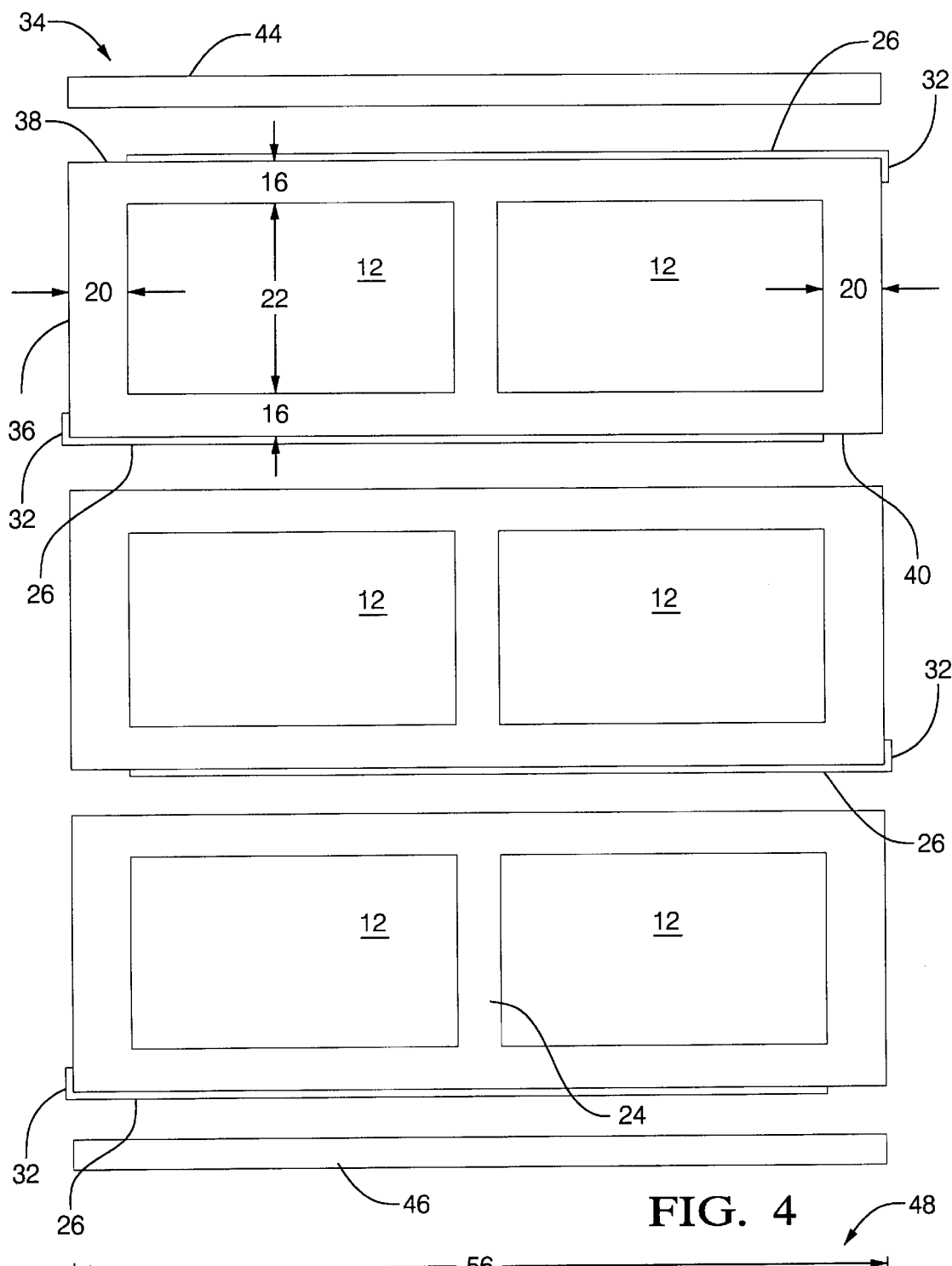
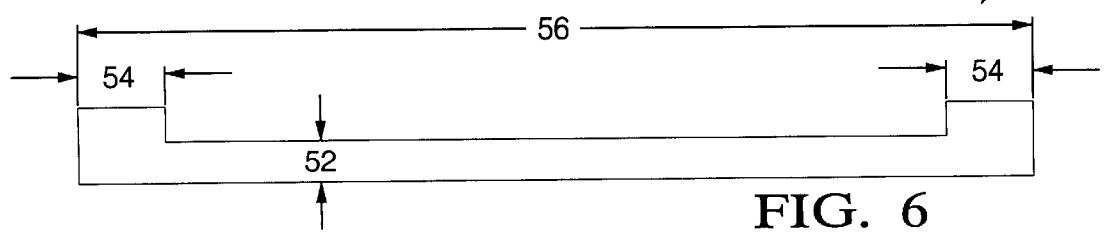
FIG. 4
FIG. 6

STACKED SHAPE PLASMA REACTOR DESIGN FOR TREATING AUTO EMISSIONS

CROSS-REFERENCE TO RELATED APPLICATIONS

The present application claims priority to U.S. provisional application No. 60/141,427, of David E. Nelson, et al., filed Jun. 29, 1999, entitled "Design and Method of Manufacturing a Plasma Reactor for Treating Auto Emissions—Stacked Shape,".

TECHNICAL FIELD

This invention relates to reactors for chemical reduction of nitrogen oxide (NOx) emissions in the exhaust gases of automotive engines, particularly diesel and other engines operating with lean air fuel mixtures that produce relatively high emission of NOx, and method of manufacturing same. More particularly, the invention pertains to an improved stacked shape non-thermal plasma reactor and system for use with diesel engines and the like.

BACKGROUND OF THE INVENTION

In recent years, non-thermal plasma generated in a packed bed reactor has been shown to be effective in reducing nitric oxides (NOx) produced by power plants and standby generators. These units usually have a reducing agent, such as urea, to enhance the conversion efficiency. The packed bed reactor consists essentially of a high voltage center electrode inserted into a cylinder of dielectric material, usually a form of glass or quartz.

An outside or ground electrode is formed by a coating of metal in various forms, including tape, flame spray, mesh, etc. The space between the center electrode and the inside diameter of the dielectric tube is filled with small diameter glass beads. When high voltage alternating current is applied to the center electrode, the surfaces of the beads go into corona, producing a highly reactive and selective surface for inducing the desired reaction in the gas.

Unfortunately, the packed bed design with its loose beads and glass dielectric is impractical for use in the conditions found in a mobile emitter, such as a car or truck. The vibration and wide temperature swings of the vehicle system would damage the packed bed and the necessary temperature and vibration isolation needed to make it survive would not be cost effective.

A reactor for use with diesel engines and other engines operating with lean air fuel mixtures is disclosed in commonly assigned U.S. patent application Ser. No. 09/465,073, currently pending entitled "Non-thermal Plasma Exhaust NOx Reactor", which is hereby incorporated by reference herein in its entirety. Disclosed therein is a reactor element comprising high dielectric, nonporous, high temperature insulating means defining a group of relatively thin stacked cells forming gas passages and separated by the insulating means. Alternate ground and charge carrying electrodes in the insulating means on opposite sides of the cells are disposed close to, but electrically insulated from, the cells by the insulating means. The electrodes may be silver or platinum material coated onto alumina plates and are coated in a pattern that establishes a separation between the electrodes and the connectors of alternate electrodes suitable to prevent voltage leakage. Conductive ink is sandwiched between two thin nonporous alumina plates or other suitable insulating plates to prevent arcing while providing a stable electrode spacing for a uniform electric field.

There remains a need for an improved non-thermal plasma reactor and an improved method of preparing same which lowers overall cost by reducing manufacturing complexity, the number of components and provides design and manufacturing flexibility.

SUMMARY OF THE INVENTION

The present invention provides a non-thermal plasma reactor and method of preparing same. The non-thermal plasma reactor element is prepared from a formed shape of dielectric material used as a building block for creating the region of the non-thermal plasma reactor wherein plasma is generated. The formed shape defines an internal cell in the plasma reactor having an exhaust passage for flowing exhaust gas to be treated therethrough. In one embodiment, the formed shape comprises a full cell. In an alternate embodiment, the formed shape comprises a half-cell that is assembled together with a second half-cell to form a full cell.

Individual cells are provided with a conductive print disposed thereon to form electrodes and connectors. In a preferred embodiment, the conductive print comprises a continuous grid pattern having a cutout region disposed opposite the terminal connector for reducing potential voltage leaks. The cutout region provides a distance between the connector and the electrode of adjacent cells sufficient to prevent arc over without diminishing performance. In yet another preferred embodiment, the conductive print is extended over the edge of the cell to provide a site for electrical connection along the side of each cell.

Multiple formed cells are stacked and connected together to form the present multi-cell stack. The upper, outermost cell in the stack is provided with a conductive print on the top and bottom walls. The remainder of the cells in the multi-cell stack have conductive print disposed only on one wall. In a preferred embodiment, the cells are connected with glass glue. Outer plates are provided to insulate the conductive print from the non-thermal plasma reactor housing and to generally protect the conductive print.

The present invention also provides a simple, low cost method for preparing a non-thermal plasma reactor comprising forming, preferably by extruding, a plurality of building block shapes for processing into cells, printing a conductive print onto individual formed cells, assembling the individual cells into a multi-cell stack, preparing electrical connections, applying insulation; and inserting the assembly into the non-thermal plasma reactor housing.

In the half-cell embodiment, the method preferably comprises printing an additional adhesive onto the rails of one of the building blocks for each cell. In a preferred embodiment, the half-cell embodiment employs roll compaction fabrication. In yet another preferred embodiment, the method comprises disposing a catalytic coating on one or both faces of the half-cells.

The present non-thermal plasma reactor is particularly useful for reducing NO, NOx, and particulate constituents in automotive applications. The present reactor and method of preparing same provides the advantages of low cost and durability compared to currently available wire, tubular, or stacked plate designs. The simplified design reduces manufacturing complexity as well as number of components, therefore reducing overall cost. By eliminating the need for spacers between individual cells, the present design and method thus further reduces the total number of components and material cost. In the full cell embodiment, the number of stack components in the stack is reduced by about 80% over prior designs using spacers. In the half-cell embodiment, the number of stack components in the stack is reduced by about 57% over prior designs using spacers.

The present method using formed shapes as building blocks provides flexibility and may be used in conjunction with conventional processing methods. The printing sequence is defined from the top of the multi-cell stack to the bottom, further minimizing the number of components. Use of three-dimensional conductive print simplifies the preparation by eliminating the need for a secondary conductive print along the edge of the multi-cell stack after assembly.

These and other features and advantages of the invention will be more fully understood from the following description of certain specific embodiments of the invention taken together with the accompanying drawings.

BRIEF DESCRIPTION OF THE DRAWINGS

Referring now to the drawings, which are meant to be exemplary, not limiting, and wherein like elements are numbered alike in the several Figures:

FIG. 4 is a view of a multi-cell stack.

FIG. 6 is a view of an alternate embodiment for the individual cell building block of the present invention.

DESCRIPTION OF THE PREFERRED EMBODIMENT

Figure 1:
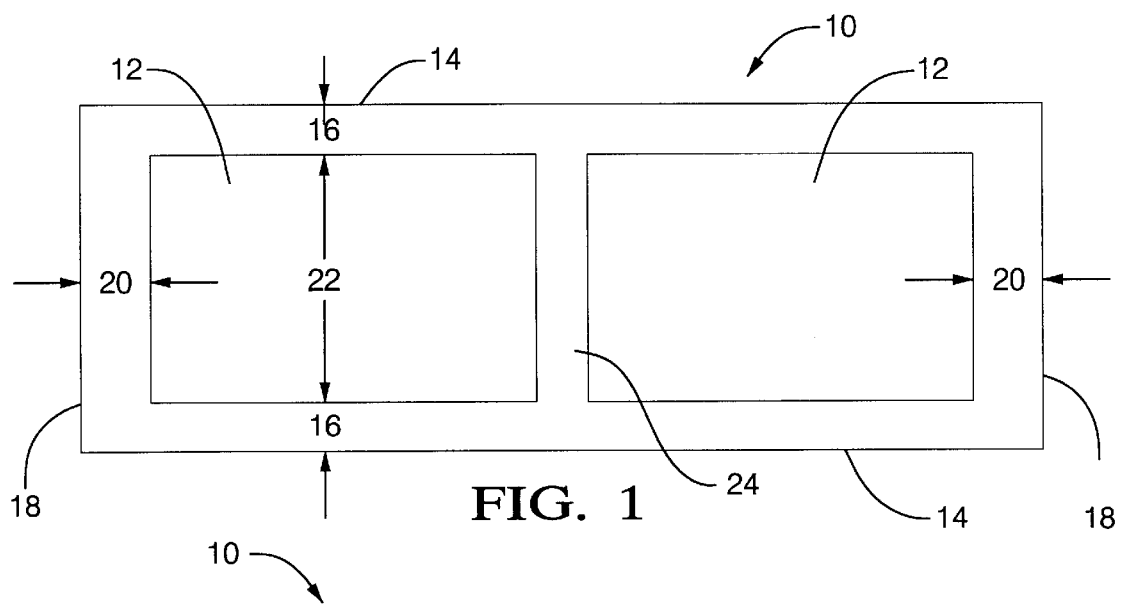
FIG. 1 is a cross-sectional view of an embodiment of the present invention of a formed shape used as a building block for the region of the non-thermal plasma reactor wherein the plasma is generated.

Referring to FIG. 1 of the drawings in detail, in the present reactor and method of preparing same, a formed shape 10 is used as a full cell building block for forming the region of the non-thermal plasma reactor wherein plasma is generated. After processing, the formed shape 10 defines an internal cell in the plasma reactor having an exhaust passage 12. The material used to form shape 10 may be any material having a high dielectric constant, including, but not limited to, cordierite, titania, alumina, steatite, mullite, plastics, or a combination thereof. Preferably, the dielectric material comprises cordierite or alumina. Forming may be by any method, including, but not limited to, forming by extruding.

The single dielectric barrier wall 14 of cell 10 preferably comprises a thickness 16 from about 0.3 to about 0.8 millimeters. Sidewalls 18 form dielectric barriers for preventing voltage leaks to the outside. Sidewalls 18 preferably comprise a thickness 20 of about 10 to about 20 millimeters.

The height 22 of the exhaust passage 12 may be selected in accordance with voltage requirements and power supply capabilities. In the embodiment of FIG. 1, the height 22 of the exhaust passage 12 is about 1 to about 2 millimeters.

If desired, structural ligament 24 may be provided to support the exhaust passage 12. The structural ligament 24 is formed as part of the dielectric building block shape, thus providing easy, low complexity manufacturing.

Figure 2:
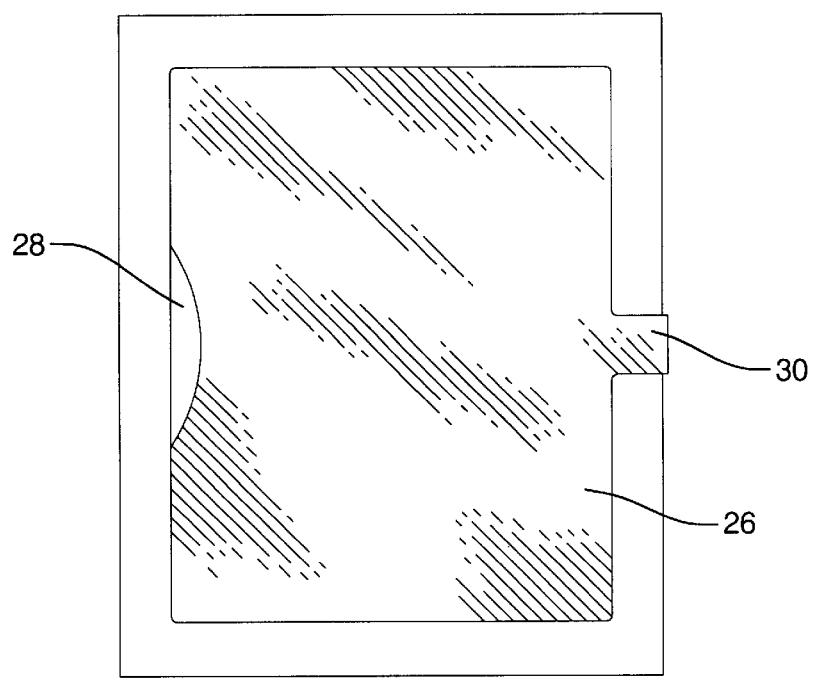
FIGS. 2A and 2B are views of the embodiment of FIG. 1, with FIG. 2A providing a cross-sectional view of the conductor print for the individual cells forming the non-thermal plasma reactor and FIG. 2B showing the conductor print rolled over the edge of the cells.
Figure 2:
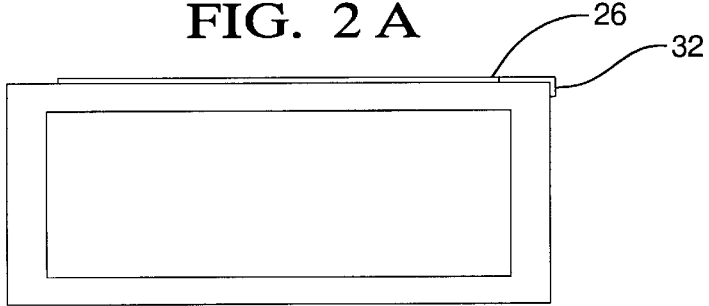

As shown in FIG. 2A, individual cells 10 each have a conductive print 26 disposed thereon. When too short a distance is provided between the electrode of one cell and the connector of another cell in a multi-cell stack, a potential failure condition is presented where high voltage could leak away from the reactor. Preferably, the conductive print 26 is patterned to form electrodes so as to provide a distance between the connector and the electrode of adjacent cells sufficient to prevent arc over without diminishing performance. Preferably, conductive print 26 comprises a continuous grid pattern having a cutout region 28 disposed opposite terminal connector 30 for reducing potential voltage leaks. In another preferred embodiment, shown in FIG. 2B, the conductive print 26 is extended over the cell edge 32 to provide a site for electrical connection along the side of each cell 10.

Figure 3:
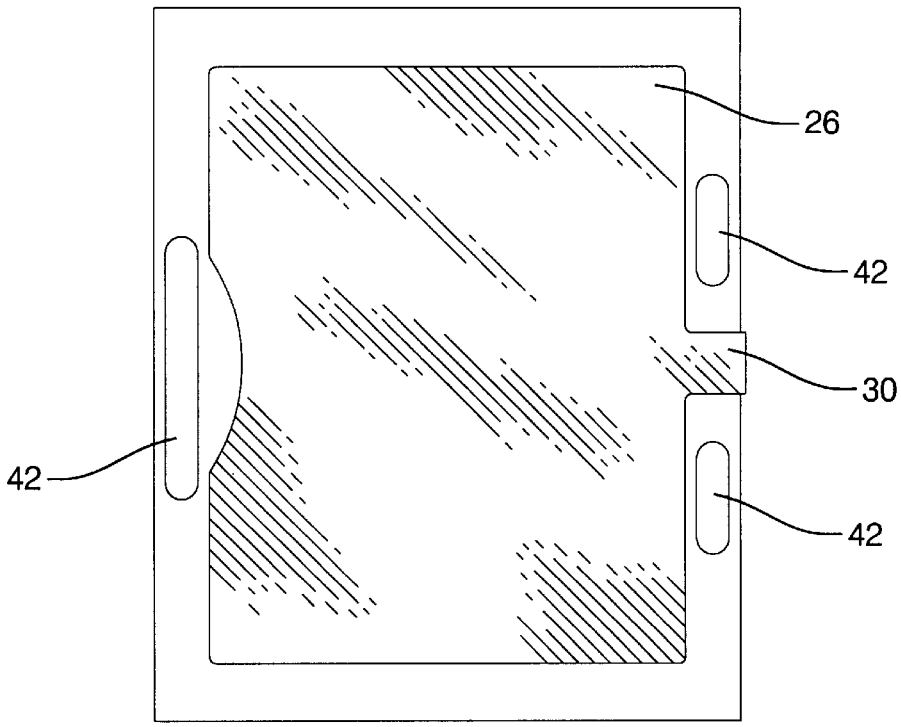
FIG. 3 is a cross-sectional view of an embodiment of the present invention using glass glue to connect the multiple cells of the non-thermal plasma reactor.
Figure 7:
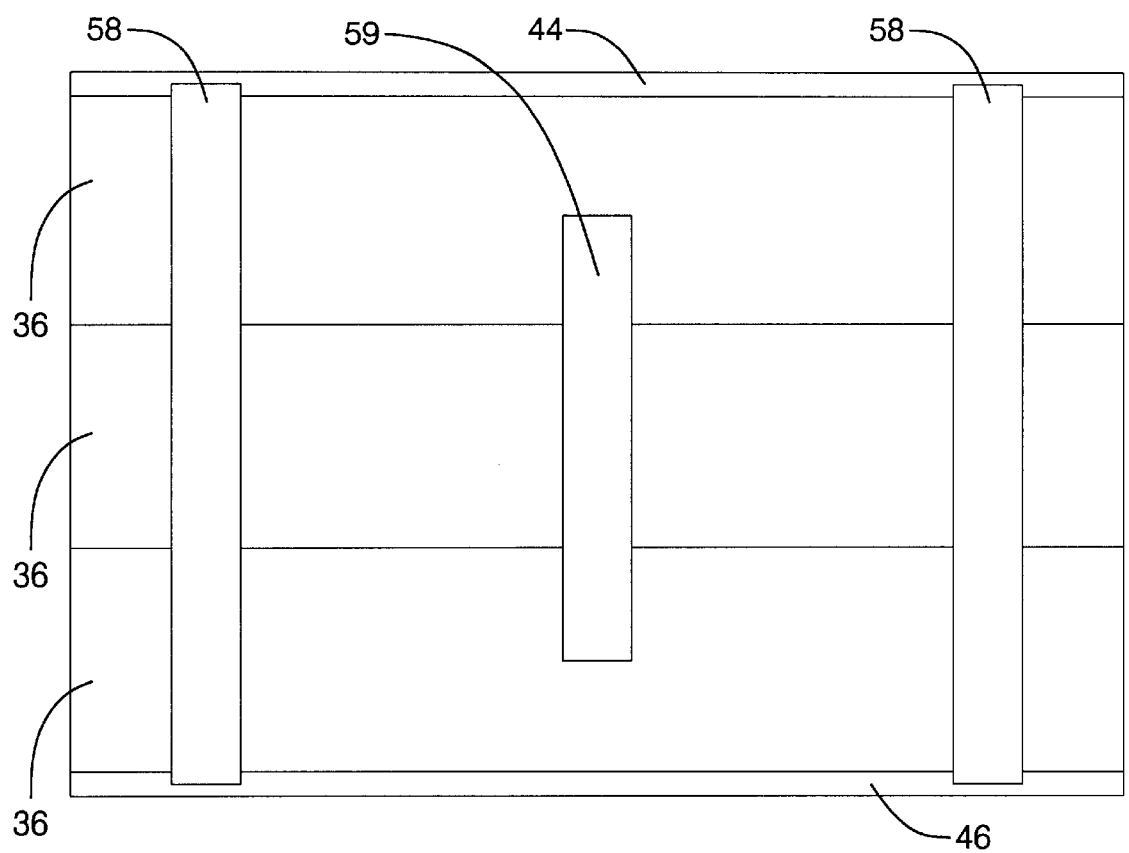
FIG. 7 is a side view of an embodiment of the present invention using adhesive applied to the assembled stack for securing the cells.

Multiple formed cells 10 combine to create the present multi-cell stack 34 as shown in FIG. 4. The upper, outermost cell 36 has a conductive print 26 on the top 38 and bottom 40 walls of the cell 10. The remainder of the cells 10 in the multi-cell stack 34 have conductive print 26 disposed only on one wall. Alternatively, both top and bottom walls of these cells may be coated so as to provide intimate contact between the conductive print 26 and each cell wall. Cells 10 within the multi-cell stack 34 are connected together. Preferably, the cells 10 are connected to one another via glass glue diffused at various locations into the dielectric material forming the cell 10. Typical glass glue print locations 42 are shown in FIG. 3. The glass glue 42 forms a robust bond securing the cells and further acts as an insulator. In an alternate embodiment, the cells 10 are held together via collars (not shown) provided so as to hold multiple cells in compression with one another while at the same time permitting some lateral movement between the cells 10. In yet another embodiment, as shown in FIG. 7, an adhesive 58, such as glass glue, forms a side attachment for holding the multi-cell stack 34 together (with numeral 59 indicating bus connection). The method comprises assembling the multi-cell stack 34, compressing the stack 34 into position, and applying an adhesive 58 to edges of the multi-cell stack 34. Typically, two strips of adhesive 58 are provided on each side of the stack 34, extending from outer plates 44, 46 and covering interior end faces.

Outer plates 44 and 46 are provided to insulate electrodes formed by the conductive print 26 from the non-thermal plasma reactor housing (not shown) and to generally protect the electrodes.

Electrical connections may be provided via a metallic strip soldered or welded, for example, to each terminal in the multi-cell stack 34. Alternatively, electrical contact between the terminals in the multi-cell stack 34 and the power supply may be achieved using a compression force on a common bus bar type terminal to hold the bus bar against the terminals. A single compression mechanism is contemplated for electrical connections on each side of the multi-cell stack 34. A non-thermal plasma reactor containing the present reactor element may include a high temperature housing surrounding said reactor element, an insulated conductor connected with said cells for connecting first electrodes to an alternating voltage source; a grounded conductor connected with second electrodes of said cells for connecting said second electrodes to ground; and means for directing exhaust gas to be treated through exhaust passages of said cells.

Figure 5:
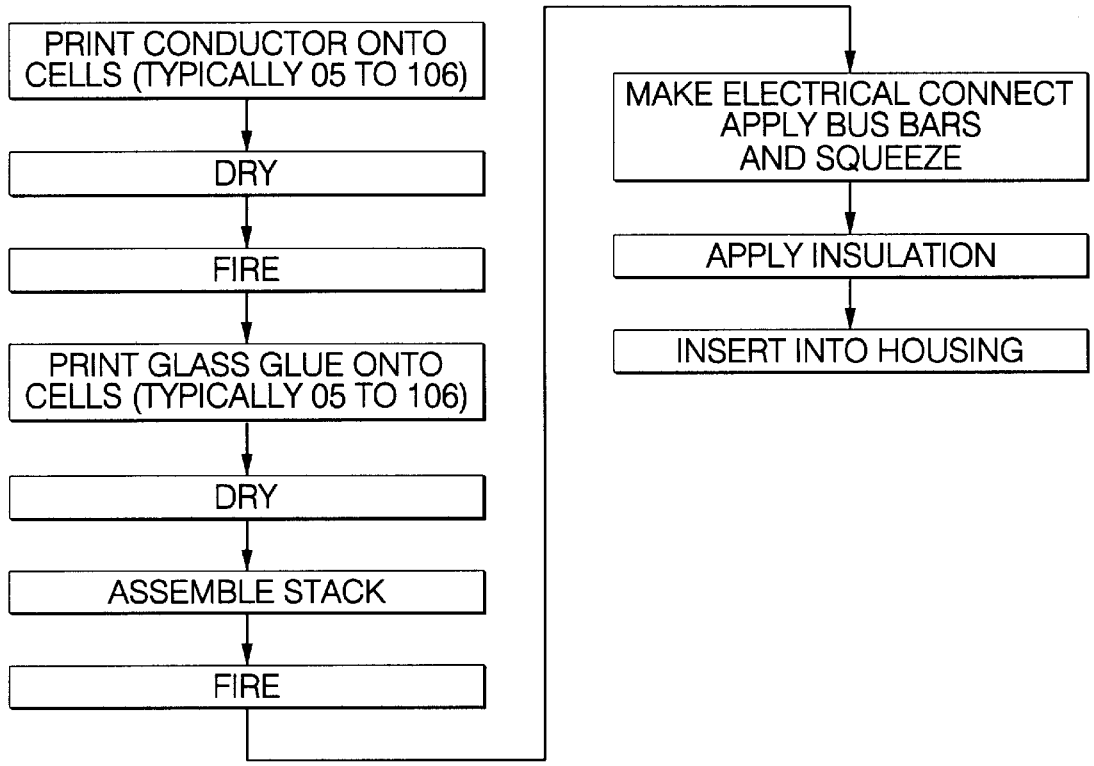
FIG. 5 is a schematic showing a flow diagram of the present method.

As illustrated in FIG. 5, the present invention provides a simplified method of low complexity for preparing a stacked shape non-thermal plasma reactor. The small number of parts further contributes to the reduction of the overall cost of manufacturing. The simplified schematic shown in FIG. 5 provides the steps of 1) printing the conductive print 26 onto the individual cells 10 (typically from about 5 to about 100 cells); 2) drying; 3) firing; 4) printing the glass glue 42 onto the individual cells 10; 5) drying; 6) assembling the individual cells 10 into a multi-cell stack 34; 7) firing; 8) preparing electrical connections, applying bus bars, and compressing same; 9) applying insulation; and 10) inserting the assembly into the non-thermal plasma reactor housing. Conventional procedures known in the art may be employed for printing, firing, drying, etc.

In another embodiment, shown in FIG. 6, a half-cell building block 48 may be used to prepare the present multi-stack plasma reactor element. Building block 48 comprises a half-cell height 50, dielectric barrier wall thickness 52, dielectric sidewall thickness 54, and cell width 56. In this embodiment, two building blocks 48, 48 are assembled, one inverted on the top of the other, to achieve the formed shape of cell 10 of the embodiment of FIG. 1. Preferably, the embodiment of FIG. 6 is prepared using roll compaction fabrication. This provides the advantages of low cost and dimensionally precise part production. Alternatively, conventional fabrication methods known in the art may also be employed. These methods include, but are not limited to, tape casting or roll compaction of flat sheets and assembly into the desired building block shape by laminating, grinding, pressing, co-firing, gluing, brazing, or other means.

An additional advantage to the embodiment of FIG. 6 is the resultant "open" face provided on each building block piece, allowing for a catalytic coating to be printed on one or both faces, if desired.

Optionally, additional rails may be added to provide increased support. For example, an optional structural ligament such as the structural ligament 24 shown in the embodiment of FIG. 1 may be provided.

The method for preparing the embodiment of FIG. 6 is similar to the method provided in FIG. 5. Additional steps include printing an additional adhesive, such as glass, onto the rails of one of the building blocks 48, 48 for each cell to provide bonding of all layers when the multi-cell stack 34 is assembled from the pairs of building blocks 48, 48.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A non-thermal plasma reactor element comprising:
    a multi-cell stack comprising a plurality of formed building blocks of dielectric material, walls of said building blocks defining a cell having an exhaust passage for flowing gas therethrough, wherein a conductive print forming an electrode and connector is disposed on at least one wall of said cell; and
    outer insulative plates disposed on opposite ends of said multi-cell stack.

2. The non-thermal plasma reactor element of claim 1, wherein said building block comprises a full cell.

3. The non-thermal plasma reactor element of claim 1, wherein said building block comprises two half cells.

4. The non-thermal plasma reactor element of claim 1, wherein said conductive print comprises a continuous grid pattern forming an electrode and terminal connector and having a cut-out region disposed opposite said terminal connector for reducing potential voltage leaks.

5. The non-thermal plasma reactor element of claim 1, wherein said conductive print is extended over an edge of the said cell to provide a site for electrical connection along the side of each cell in said multi-cell stack.

6. The non-thermal plasma reactor element of claim 1, wherein said conductive print is disposed on top and bottom walls of outermost cell in said multi-cell stack and remainder of said cells have conductive print disposed on only one wall.

7. The non-thermal plasma reactor element of claim 1, wherein said cells comprising said multi-cell stack are connected with glass glue diffused at selected print locations into dielectric material comprising said cells.

8. The non-thermal plasma reactor element of claim 1, wherein said cells comprising said multi-cell stack are connected with collars.

9. The non-thermal plasma reactor element of claim 1, wherein said cells comprising said multi-cell stack are connected with adhesive disposed along sides of said multi-cell stack.

10. The non-thermal plasma reactor element of claim 1, wherein said conductive print comprises three-dimensional conductive print.

11. The non-thermal plasma reactor element of claim 1, wherein said dielectric material is selected from the group consisting of cordierite, titania, alumina, steatite, mullite, plastics, or a combination thereof.

12. The non-thermal plasma reactor element of claim 1, wherein said walls defining said cells comprise side walls and top walls, wherein said side walls comprise a thickness of about 10 to about 20 millimeters and said top walls comprises a thickness of about 0.3 to about 0.8 millimeters.

13. The non-thermal plasma reactor element of claim 1, wherein said building block further comprises a structural ligament formed as part of said dielectric building block.

14. The non-thermal plasma reactor element of claim 1, wherein said formed building blocks are formed via extrusion.

* * * * *